United States Patent [19]
Komatsu et al.

[11] Patent Number: 5,684,685
[45] Date of Patent: Nov. 4, 1997

[54] HIGH VOLTAGE POWER SUPPLY FOR IMAGE TRANSFER AND IMAGE FORMING APPARATUS USING THE SAME

[75] Inventors: Shun-ichi Komatsu, Yokohama; Toshihiko Kitahara, Tokyo, both of Japan

[73] Assignee: Canon Kabushiki Kaisha, Tokyo, Japan

[21] Appl. No.: 431,981

[22] Filed: May 1, 1995

[30] Foreign Application Priority Data

May 6, 1994 [JP] Japan .................................. 6-094203

[51] Int. Cl.$^6$ ............................. H02M 7/44; G03G 15/14
[52] U.S. Cl. ................................................ 363/95; 355/271
[58] Field of Search .............................. 355/271, 274, 355/219, 204; 363/95

[56] References Cited

U.S. PATENT DOCUMENTS

| | | |
|---|---|---|
| 5,151,736 | 9/1992 | Ohzeki et al. ........................ 355/208 |
| 5,179,397 | 1/1993 | Ohzeki et al. ........................ 346/160 |
| 5,311,268 | 5/1994 | Ohzeki et al. ........................ 355/285 |
| 5,485,248 | 1/1996 | Yano et al. ........................... 355/206 |

*Primary Examiner*—Adolf Berhane
*Attorney, Agent, or Firm*—Fitzpatrick, Cella, Harper & Scinto

[57] ABSTRACT

The invention is to provide an improved high voltage transfer power supply and an image forming apparatus, regardless of resistance connected in series to the transfer roller and impedance change of the transfer roller. The high voltage transfer power supply, if the voltage produced from the output winding NS1 of the transfer transformer T1 is controlled based on the set value of register 8 merely by the process of ATVC, can provide neither an appropriate transfer voltage nor an excellent transfer image. Accordingly, a correction value resulting from the resistance R2 and the impedance change of the transfer roller by means of CPU12, and a set value in a register 8 is corrected by the correction value to obtain an optimal transfer image of the original.

9 Claims, 4 Drawing Sheets

HIGH VOLTAGE POWER SUPPLY FOR IMAGE TRANSFER AND IMAGE FORMING APPARATUS USING THE SAME

BACKGROUND OF THE INVENTION

1. Field of the Invention

The present invention relates to image forming apparatus, such as a copying machine or a printer, and more particularly to a transfer high voltage power supply used therefor.

2. Brief Description of the Prior Art

In a conventional image forming apparatus, a latent image of a document is formed by exposing a charged rotating drum, on which a toner is deposited, and deposited toner is transferred onto a sheet of ordinary paper, and by repeating the process, a large number of copies can be produced. In the transfer stage, a high voltage is applied to a transfer roller formed of an electroconductive rubber. The resistance value of the transfer roller including that of photosensitive drum varies in accordance with various ambient conditions, such as the temperature, humidity or the like, as well as the production lot or materials, and therefore the optimal transfer voltage also depends on such ambient states or other conditions.

Conventionally, the optimal transfer voltage was determined by the method called ATVC (Auto Transfer Voltage Control) through the following steps:

(1) to flow a fixed current prior to forming an image and measure the voltage applied to both ends of transfer roller; and (2) to add, in the step of image forming, a "certain" voltage to the value obtained in (1) above, and the resulting voltage is applied to the transfer roller.

In other words, since the impedance value is calculated in the step (1), an optimal voltage can be applied in accordance with the ambient conditions. The "certain" value is the value which is predetermined in accordance with the impedance obtained through calculation so as to be enabled to obtain an improved transfer image.

However, in this conventional method, power source for the transfer high voltage needs reverse voltage for cleaning the transfer roll other than forward voltage for transfer. To apply the reverse voltage, the transfer output circuit has a resistance serially connected to the load (the transfer roll).

Owing to this series resistance, in producing a transfer forward voltage, a voltage drop is caused. Therefore, the voltage actually applied on both ends of the transfer roller becomes lower than that produced from the output ends of the transfer output circuit. The error is negligible when the transfer forward current is relatively small, but some correction is necessary, when the current is large.

The accuracy required for the transfer forward voltage, although varying depending on such as the kind of the toner which is used, is approximately several hundreds volts in other words, the accuracy is several percent, assuming the maximum voltage is 9K volts. Therefore, the voltage drop mentioned above is not negligible. Since the value of the series resistance which is small in excess can reduce the accuracy of the current for cleaning, the resistance value is normally selected as a value increased by a certain amount.

In addition to the first problem above, there is also another problem. That is to say, although the transfer impedance can be first measured at the time when performing ATVC, still the impedance of the transfer roller can further vary at the time when the recording medium such as a sheet of paper is introduced. Namely, the impedance being measured by the process of ATVC is merely that of the transfer roller, and the practical importance in image forming is the overall impedance including both that of the transfer roller and that of the recording medium.

In addition, the impedance changes in accordance with the kind of the recording medium. A further problem is that the impedance of the roller including that of the recording medium is not always greater than that which exhibits in absence of recording medium. In some cases, a lowered impedance exhibits in dependence of the kind of the medium due to the leakage current through the recording medium to other portions. Accordingly, the impedance of the roller is necessary to be successively measured, and otherwise the current control thereof cannot be performed. In other words, the control performed merely by ATVC alone is not satisfactory.

Further, the meaning of the "impedance of the transfer roller" in the present invention is the impedance observed from the input end of the transfer roller, including that of the recording medium, when the photosensitive substance and the recording medium are present. Such an overall impedance is sometimes referred to merely "resistance" in the hereinafter description, since the value of such impedance mainly consists of resistance.

SUMMARY OF THE INVENTION

An object of the present invention is to provide a high voltage power supply and an image forming apparatus capable of solving the aforementioned problems.

In another aspect of the present invention, an object is to provide a high voltage power supply and an image forming apparatus which is able to apply proper voltage to a transfer roll in regardless of impedance change of the transfer roll due to a recording medium (paper) and value of series resistance to obtain a high quality transferred image.

To accomplish such an object, one aspect of the present invention is a high voltage power supply and an image forming apparatus which comprises means for applying a high voltage to a transfer roller and means for correcting the high voltage in accordance with the impedance change caused by the transfer roller and the recording medium.

In a further aspect of the present invention, it is a further object of the invention to provide a high voltage power supply and an image forming apparatus in which the voltage produced from one output terminals is controlled in accordance with a set value and high voltage from the output terminals is supplied to a transfer roller through a series resistance, and the high voltage power supply comprises voltage detecting means for detections voltage applied to the output terminal, current detecting means for detecting current through the transfer roller, and correction means for correcting the set value of voltage in accordance with an impedance change of the transfer roller.

By the construction stated above, the set value of voltage is corrected according to the impedance change in the transfer roller and therefore an appropriate transfer voltage is applied on the transfer roller.

These and other objects, advantages and features of the present invention will become more apparent from the following detailed description and the accompanying drawings.

DETAILED DESCRIPTION OF THE PREFERRED EMBODIMENTS

Figure 1:
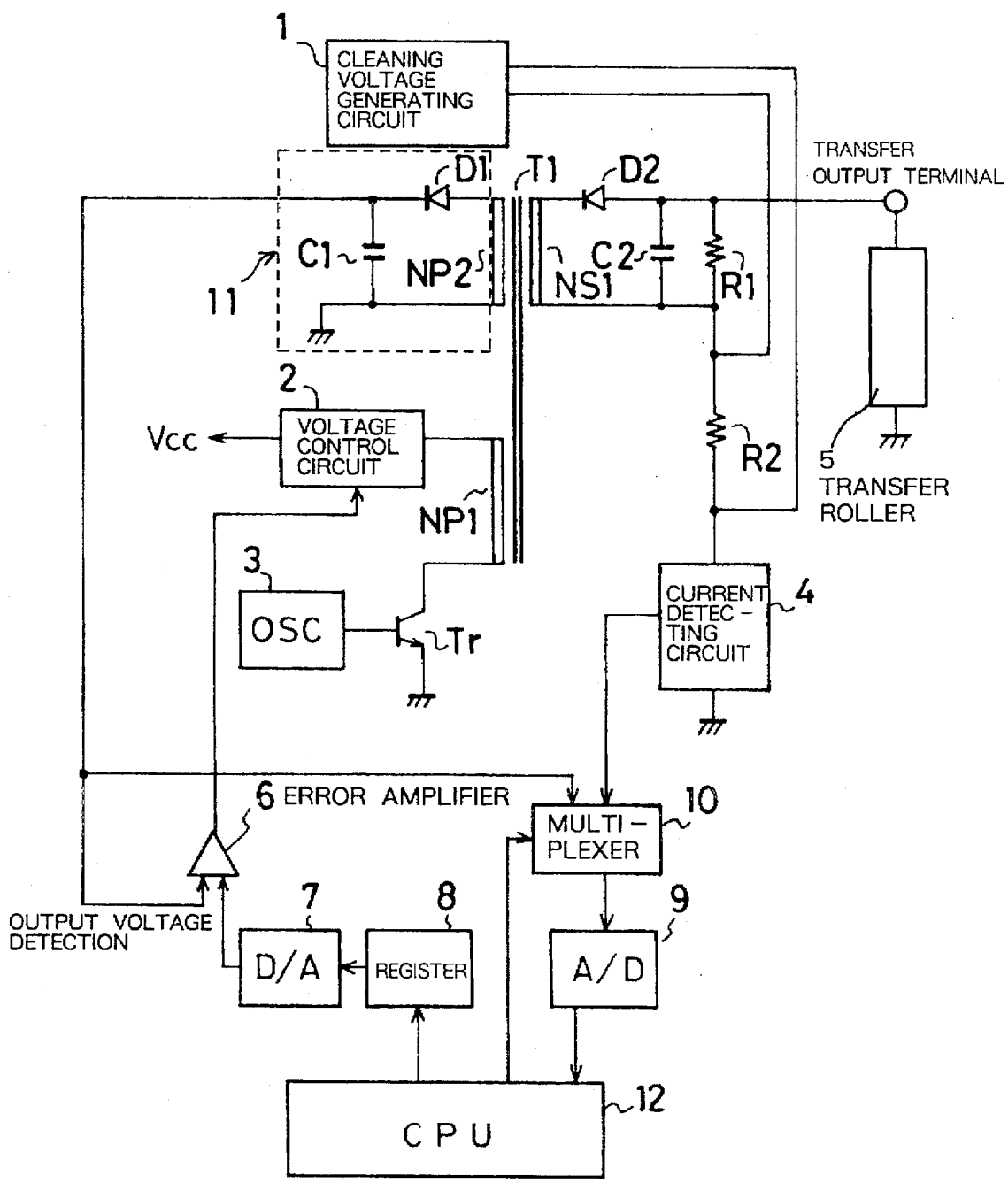
FIG. 1 is a block diagram of an embodiment of the invention.
Figure 4:
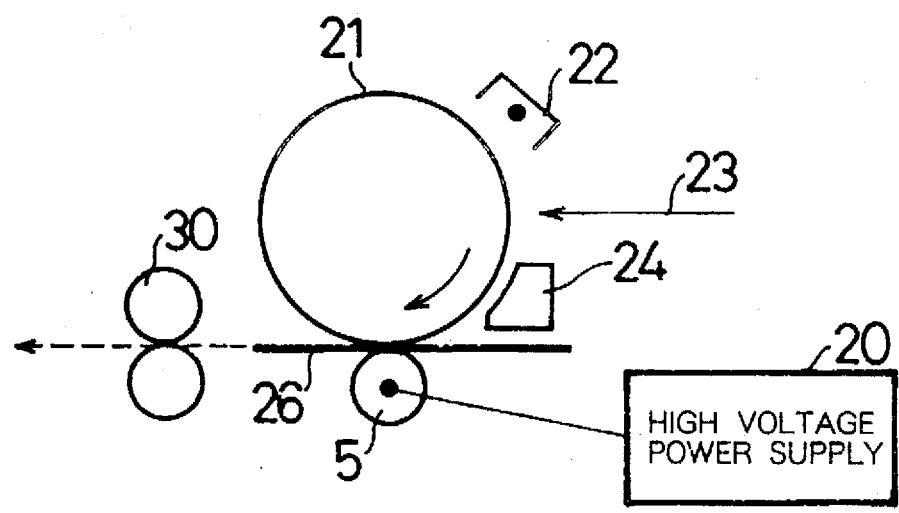
FIG. 4 is a schematic view of an image forming apparatus including a transfer power supply.

FIG. 1 is a block diagram of an embodiment of a high voltage power supply as an embodiment of the invention. FIG. 4 is a brief sectional view of an electrophotographic image forming apparatus, in which a photosensitive drum 21 is uniformly charged by a charging device 22, and then exposed by an image light source 23 to form an electrostatic latent image, which is developed by a developing device 24 to form a toner image on the photosensitive drum 21. The toner image is transferred onto a recording medium 26 by means of a transfer roller 5, and is fixed by a fixing roller 30 and the recording medium 26 is discharged. For this purpose, the transfer roller 5 is applied with a positive electric field in order to make ease of a negatively charged toner to be transferred onto the recording medium 26.

Referring now to FIG. 1 of the drawings, a transistor Tr drives a transfer transformer Tr with a constant frequency generated by an oscillator 3. Voltage control circuit 2 controls the voltage which is applied on a primary winding NP1 of transformer T1. An output of secondary winding NS1 is rectified by a diode D2, smoothed by a capacitor C2, and is applied on transfer roller 5 as a transfer output. A reference numeral R1 is a breeder resistor, R2 is a series resistance, and 4 is output current detecting circuit for detecting the current flowing through the transfer roller.

A cleaning voltage generating circuit is denoted by the numeral 1, which applies on the transfer roller 5 with the voltage reverse to that applied during image transfer, in order to return the remaining toner to photosensitive drum 21 for cleaning the transfer roller 5.

Figure 2:
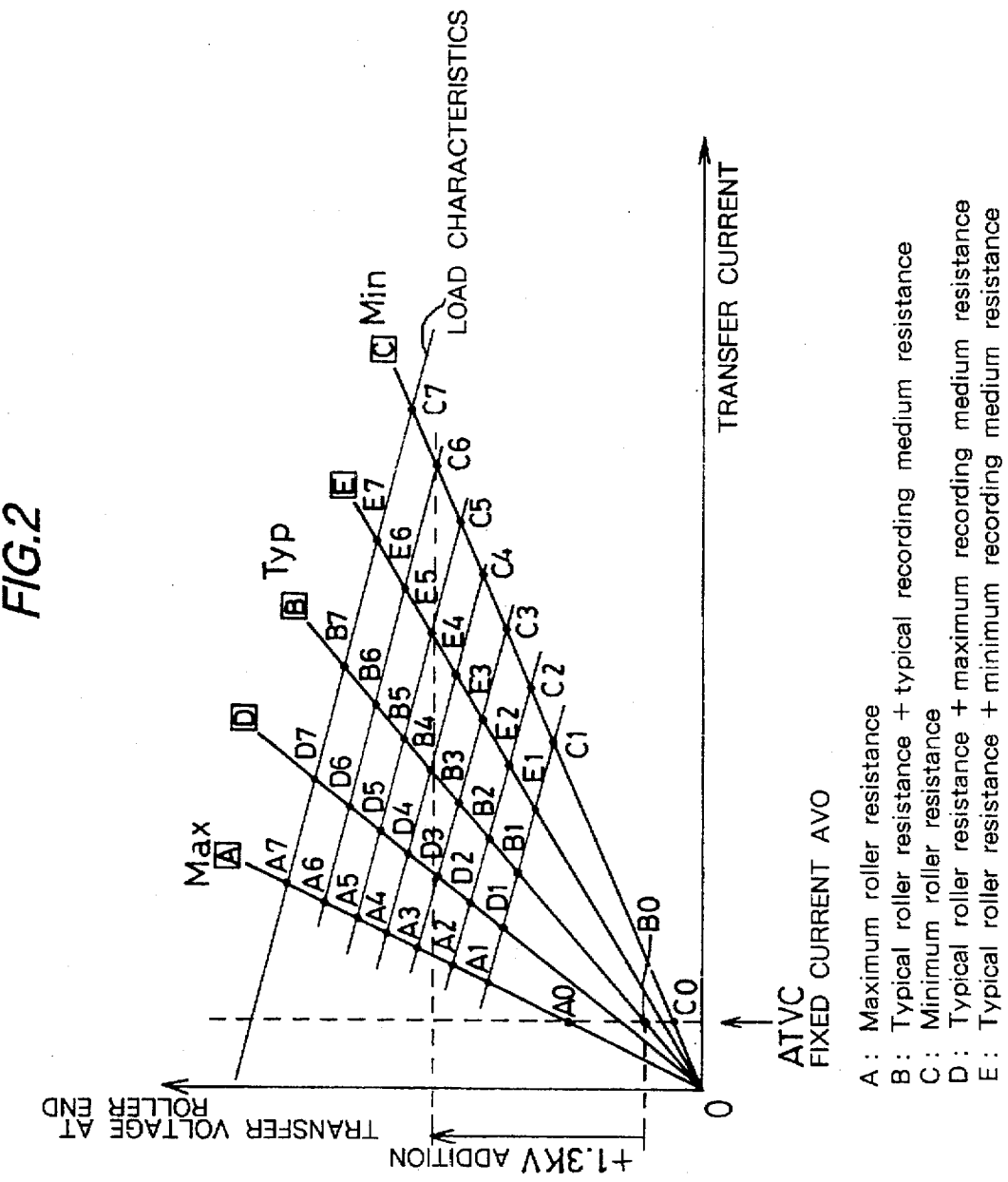
FIG. 2 is an illustrative diagram of an embodiment.

A series resistance R2 is provided fop causing this reverse voltage at the transfer output terminal. Due to the series resistance R2, when the forward voltage is produced, the forward voltage drops. For example, if level "7" is set at a register 8, the mope transfer current increases A7→D7→B7→E7→C7 as shown in FIG.2, the more the voltage drop increases. Therefore, actual transfer voltage applied at both ends of the transfer roller 5 is much less than the output voltage of the transfer transformer T1.

The voltage drop can be disregarded when the transfer voltage is relatively small, since line between A7–C7 becomes nearly parallel with the horizontal axis. But some correction is required when the current is larger.

A winding NP2 for detecting the output voltage, together with a rectifying diode D1 and a smoothing capacitor C1, forms the output voltage detecting circuit 11. The output of the output current detecting circuit 4 is applied to a multiplexer 10 and analog/digital converted by an A/D converter 9 to enter the detected current to CPU 12. Also, the output of the output voltage detecting circuit 11 is applied to a multiplexer 10 and analog/digital converted by an A/D converter 9 to enter the detected voltage to CPU 12. CPU 12 determines an optimal transfer voltage based on the applied values of the output voltage and output current, and sets a set value in the register 8. The process thereof will be hereinafter described referring to FIGS. 2 and 3.

The set value of register 8 is digital/analog converted in the D/A converter 7, and the error amplifier 6 compares the output value of D/A converter 7 with the value from the output voltage detecting means 11 to control the voltage control means 2 to control the voltage applied on the NP1 winding so that the transfer voltage becomes a desired value.

Figure 3:
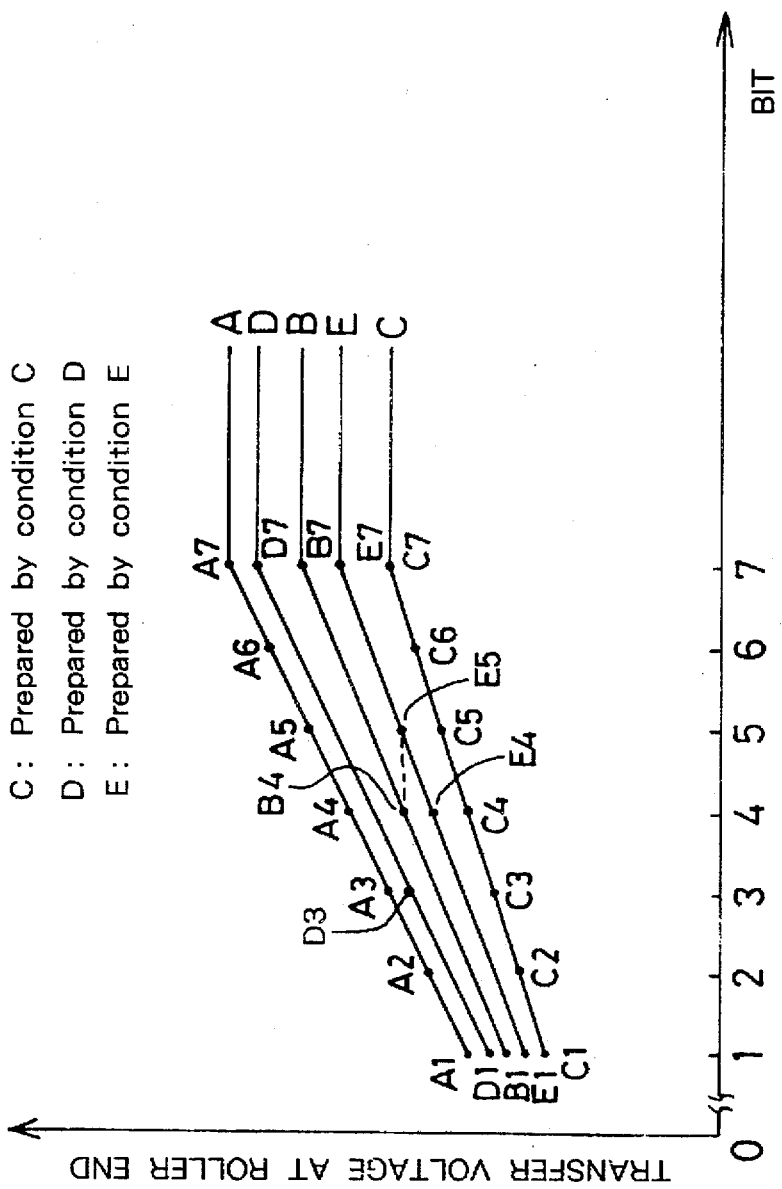
FIG. 3 is an illustrative diagram of setting a register 8.

It is described how to set the setting value in register 8 referring to FIGS. 2 and 3.

In FIG. 2, the voltage applied on the both ends of transfer roller 5 and the transfer current are plotted with respect to the vertical and horizontal coordinates, respectively, end accordingly the gradient of the line represents the resistance (impedance) of transfer roller 5. As stated before, the resistance value varies in accordance with the ambient conditions, such as temperature and humidity. The maximum and minimum values thereof are assumed as A and C, respectively. Since the resistance of transfer roller 5 varies in the range from A to C, CPU 12 receives either one of voltages distributed from A0 to C0 through the output voltage detecting circuit 11, when a fixed current AVO is let flow by ATVC. A predetermined voltage, such as 1.3 KV, is added to the received voltage. As shown in FIG. 3, such adding operation is performed on a bit table in CPU 12. The bit value along the horizontal coordinate in FIG. 3 is the value of register 8 in FIG. 1. The table is provided in advance, because, without such a table, it can not be found how much bit value should be added to the bit value received by A/D converter 9 to add 1.3 KV.

Here, the gradient can be different in the cases between prepared based on the maximum value A and minimum value B of the resistance. In general, the value is prepared using the central value B, but the error increases as displaced from the central value, and it is impossible to obtain the optimal value even applying ATVC process.

In view of solving the problem above, a table shown as A to E in FIG. 3 is used to obtain in accordance with the voltage read by the constant current of ATVC in the case of before image being formed and with the current flowing through the transfer roller 5 in the case of during image formation. By using such a table, the error caused by the series resistance R2 is completely compensated and always the optimal transfer voltage is obtained.

Here, providing an example, it is shown how to set the value into register 8. In FIG. 2, it is assumed, when a constant current is let flow, a point B0 is obtained, for which the value 1.3 KV is added in CPU 12. Here, it is desired an optimal voltage Is always obtained during image being formed, even if the resistance value is altered due to the kind of paper. Therein, when the added voltage is traced in the right side direction, the point B4 is obtained in the case of ATVC with the load by transfer roller 5 alone. At this point of time, register 8 is set with "4", as the initial set bit value as shown by the horizontal coordinate in FIG.3.

Then, the image forming step is started, the paper is fed, and it is assumed that the resistance value of transfer roller 5 is altered from B to E, where E is an example for which the resistance value of the recording medium such as paper is minimum. Regardless of change of the resistance value from point B to point E, when the register 8 is still continued to be set in 4 bits, the point moves to E4 due to voltage drop caused in series resistance 2, and the end voltage of transfer roller 5 decreases. To prevent such defect, the point is moved to E5 as seen in the dotted line shown in FIG.3. Namely, the set value of register 8 is corrected from "4" to "5". By such a correction, the point is changed to E5, thereby an adequate voltage, the same as at B4, is applied on transfer roller 5, and a most excellent image is obtained. The same result is effected when the resistance of the roller 5 has changed from point B to D. Point D is an example in which the resistance of the recording medium, such as paper, is maximum. The point moves from B4 to D3.

In addition, although the additional voltage 1.3 KV is constant in the aforementioned example, this additional voltage is changed based on the voltage read by the constant current in ATVC, by changing the table itself. In the image forming process using an electrophotographic copying machine, the additional voltage is required to be changed depending on the kind of the toner. In such cases, the required transfer voltage can be easily applied.

As stated above, the initial set voltage is obtained by ATVC, but not limited therein, and can be also obtained by any suitable method. This initial setting can be also performed in the form of correction according to the series resistance value and the impedance change of the transfer roller.

As discussed above, the set value for determining the transfer voltage is corrected in accordance with the series resistance value and the impedance change of the transfer roller due to the recording medium, thereby preferable transfer voltage is applied to the transfer roller to provide a most excellent transfer image.

While the present invention has been described with respect to what is presently considered to lie the preferred embodiment, it is to be understood that the invention is not limited to the disclosed embodiments.

What is claimed is:

1. A high voltage transfer power supply for an image forming apparatus, whose output terminal voltage is controlled in accordance with a set voltage and a high voltage produced from said power supply is applied on a transfer roller through a series resistance, comprising:

voltage detecting means for detecting the voltage produced from said output terminal;

current detecting means for detecting the current flowing in said transfer roller; and correction means for correcting the set voltage in accordance with the impedance change of said transfer roller based on the current which is detected by said current detecting means during image formation.

2. A high voltage transfer power supply according to claim 1, wherein said correction means obtains correction values by the process of table retrieval.

3. An image forming apparatus comprising:

image forming means; and a high voltage transfer power supply, whose output terminal voltage is controlled in accordance with a set voltage and a high voltage produced from said power supply is applied on a transfer roller through a series resistance, said power supply comprising:

voltage detecting means for detecting the voltage produced from said output terminal;

current detecting means for detecting the current flowing in said transfer roller; and correction means for correcting the set voltage in accordance with the impedance change of said transfer roller based on the current which is detected by said current detecting means during image formation.

4. A high voltage transfer power supply comprising:

a transfer roller;

voltage applying means for applying a voltage to said transfer roller;

detecting means for detecting an impedance of said transfer roller due to a recording medium; and correction means for correcting the applying voltage produced from said voltage applying means.

5. A high voltage transfer power supply according to claim 4, further comprising a series resistance for applying an inverted voltage to said transfer roller.

6. A high voltage transfer power supply according to claim 5, wherein said detecting means detects the impedance which includes said series resistance.

7. A high voltage transfer power supply, according to claim 4, further comprising setting means for initially setting the applying voltage in accordance with said voltage applying means.

8. A high voltage transfer power supply, according to claim 7, wherein said setting means sets the applying voltage on the basis of an output of said detecting means.

9. A high voltage transfer power supply, according to claim 8, wherein said detecting means detects the impedance which does not include that of said recording medium.

* * * * *

UNITED STATES PATENT AND TRADEMARK OFFICE
CERTIFICATE OF CORRECTION

PATENT NO. : 5,684,685
DATED : November 4, 1997
INVENTOR(S) : Shun-Ichi KOMATSU, et al.

It is certified that error appears in the above-identified patent and that said Letters Patent is hereby corrected as shown below:

Column 1, line 8, after "to", insert --an--;
    Line 55, after "volts", delete "in" and insert therefor --. In--.

Column 2, line 23, after "merely", insert --as--;
    Line 24, delete "hereinafter description" and insert therefor --description hereinafter--;
    Line 34, delete "in";
    Line 46, delete "one" and insert therefor --the--;
    Line 50, delete "detections" and insert therefor --detecting--.

Column 3, line 24, delete "Tr" and insert therefor --T1--;
    Line 38, delete "fop" and insert therefor --for--;
    Line 42, delete "mope" and insert therefor --more--.

Column 4, line 8, delete "end" and insert therefor --and--.

UNITED STATES PATENT AND TRADEMARK OFFICE
CERTIFICATE OF CORRECTION

PATENT NO. : 5,684,685
DATED : November 4, 1997
INVENTOR(S) : Shun-Ichi KOMATSU, et al.

It is certified that error appears in the above-identified patent and that said Letters Patent is hereby corrected as shown below:

<u>Column 5</u>, line 12, delete "therein" and insert therefor --thereto--;
        Line 24, delete "lie" and insert therefor --be--.

Signed and Sealed this

Twelfth Day of May, 1998

BRUCE LEHMAN

*Attest:*

*Attesting Officer*    *Commissioner of Patents and Trademarks*